(12) United States Patent
Kang et al.

(10) Patent No.: US 7,378,193 B2
(45) Date of Patent: May 27, 2008

(54) POLYSILOXANE-BASED COMPOUND AND SOLID POLYMER ELECTROLYTE COMPOSITION USING THE SAME

(75) Inventors: Yongku Kang, Daejeon (KR); Changjin Lee, Daejeon (KR); Jun Kyoung Lee, Daejeon (KR)

(73) Assignee: Korea Research Institute of Chemical Technology, Daejeon (KR)

( * ) Notice: Subject to any disclaimer, the term of this patent is extended or adjusted under 35 U.S.C. 154(b) by 359 days.

(21) Appl. No.: 11/146,970

(22) Filed: Jun. 7, 2005

(65) Prior Publication Data

US 2005/0271948 A1 Dec. 8, 2005

(30) Foreign Application Priority Data

Jun. 7, 2004 (KR) ............... 10-2004-0041502

(51) Int. Cl.
  *H01M 6/14* (2006.01)
  *H01M 6/18* (2006.01)
(52) U.S. Cl. ............ 429/302; 429/309; 429/313; 429/317
(58) Field of Classification Search ............ 429/108, 429/188, 302, 313; 205/80–82, 84, 334, 205/354, 367, 372, 376, 776.5; 528/25, 31
See application file for complete search history.

(56) References Cited

U.S. PATENT DOCUMENTS

| 4,673,718 | A | | 6/1987 | Ryntz et al. ............ 525/476 |
| 4,766,185 | A | | 8/1988 | Ryntz et al. ............ 525/479 |
| 4,830,939 | A | | 5/1989 | Lee et al. ............... 429/192 |
| 5,227,043 | A | | 7/1993 | Shakushiro et al. ...... 204/421 |
| 5,419,984 | A | * | 5/1995 | Chaloner-Gill et al. .... 429/313 |
| 2002/0028388 | A1 | * | 3/2002 | Lee ..................... 429/303 |
| 2003/0054257 | A1 | * | 3/2003 | Noda et al. ............ 429/309 |

FOREIGN PATENT DOCUMENTS

| KR | 10-298802 | 1/2001 |
| KR | 10-394077 | 9/2002 |

OTHER PUBLICATIONS

Wright, Peter V.: "Electrical Conductivity in Ionic Complexes of Poly(ethylene oxide)", *British Polymer Journal*, vol. 7, pp. 319-327.

Harris, Caroline S. and Rukavina, Thomas G.: "Lithium Ion Conductors and Proton Conductors: Effects of Plasticizers and Hydration", *Electrochim Acta*, vol. 40, No. 13-14, pp. 2315-2320.
Gao, Lei and MacDonald, Digby D.: "Characterization of Irreversible Processes at the Li/Poly[bis(2,3-di-(2-methoxyethoxy)propoxy)phosphazene] Interface on Charge Cycling", *J. Electrochem. Soc.*, vol. 144, No. 4, Apr. 1997, pp. 1174-1178.
Rietman, E.A. and Kaplan, M.L.: "Single-Ion Conductivity in Comblike Polymers", *Journal of Polymer Science:Part C: Polymer Letters*, vol. 28, 1990, pp. 187-191.
Fang, Bin; Hu, Chun Pu; Ying, Sheng Kang: "Structure and Ionic Conductivity of Graft Polyester Networks Containing Lithium Perchlorate", *Eur. Polym. J.*, vol. 29, No. 6, 1993, pp. 799-803.
Kano, Michiyuki; Hayashi, Eriko; Watanabe, Masayoshi: "Network Polymer Electrolytes with Free Chain Ends as Internal Plasticizer", *J. Electrochem. Soc.*, vol. 145, No. 5, May 1998, pp. 1521-1527.
Abraham, K.M.; Jiang, Z.; Carroll, B.: "Highly Conductive PEO-like Polymer Electrolytes", *Chem. Mater.*, 9, 1997, pp. 1978-1988.
Oh, Bookeun; Hyung, Yoo-Eup; Vissers, Donald R.; Amine, Khalil: "Accelerating rate calorimetry study on the thermal stability of interpenetrating network type poly(siloxane-g-ethylene oxide) polymer electrolyte", *Electrochimica Acta*, 48 (2003), pp. 2215-2220.
Ahn, J.-H; Wang, G.X.; Liu, H.K.; Dou, S.X.: "Nanoparticle-disperse PEO polymer electrolytes for Li batteries", *Journal of Power Sources*, 119-121 (2003), pp. 422-426.
Fish, Daryle; Khan, Ishrat M.; Smid, Johnannes: "Conductivity of solid complexes of lithium perchlorate with poly{[ω-methoxyhexa(oxyethylene)ethoxy]methylsiloxane}", *Makromol. Chem., Rapid Commun.*, 7, 1986, pp. 115-120.
Zhang, Zhengcheng; Sherlock, David; West, Ryan; West, Robert: "Cross-Linked Network Polymer Electrolytes Based on a Polysiloxane Backbone with Oligo(oxyethylene) Side Chains: Synthesis and Conductivity", *Macromolecules*, 36, 2003, pp. 9176-9180.

\* cited by examiner

*Primary Examiner*—Alexa D. Neckel
*Assistant Examiner*—Claire L Rademaker
(74) *Attorney, Agent, or Firm*—Frommer Lawrence & Haug LLP; Ronald R. Santucci

(57) ABSTRACT

This invention relates to a polysiloxane-based compound and a solid polymer electrolyte composition prepared using the same. More particularly, the present invention relates to a polysiloxane-based polymer, which promotes easy cross-linking and also enables to control the level of cross-linking according to the concentration of an acryl group by introducing a polyalkyleneoxide group and an acryl group are introduced as side chains to the backbone of methylsiloxane polymer.

6 Claims, 2 Drawing Sheets

POLYSILOXANE-BASED COMPOUND AND SOLID POLYMER ELECTROLYTE COMPOSITION USING THE SAME

CROSS REFERENCE TO RELATED APPLICATIONS

This application claims priority of Korean Application No. 10-2004-041502, filed Jun. 7, 2004, the disclosure of which is incorporated herein by reference.

TECHNICAL FIELD OF THE INVENTION

This invention relates to a polysiloxane-based compound and a solid polymer electrolyte composition prepared using the same.

BACKGROUND OF THE INVENTION

The conventional electrochemical devices using liquid electrolytes had safety problems such as leakage and explosion and this led into the development of electrochemical devices using solid electrolytes. Lithium-polymer batteries, as one of such electrochemical devices using solid electrolytes, has been shown very advantageous in that they provide improved safety, are very economical due to highly efficient recharge/discharge rates, provide diverse designs and can provide miniaturization of batteries by manufacturing them in thin films. In particular, it has been drawing much attention to use a polyalkyleneoxide(PAO)-based solid polymer as an electrolyte because it can lead to the manufacture of batteries with much improved energy density. PAO-based solid polymer was first suggested in 1975 by P. V. Wright (British Polymer Journal Vol. 7, p. 319) and named as an ion-conductive polymer by M. Armand in 1978, and its applications has been expanded thereafter.

In general, a PAO-based solid polymer electrolyte consists of a complex between a polymer which contains electron-donating atoms such as O, N, and P and a lithium salt, for example, a complex between polyethylene oxide (PEO) and a lithium salt. This can be used as an electrolyte in electrochemical devices for operation at high temperature. However, its ionic conductivity at room temperature is as low as $10^{-8}$ S/cm and thus it has not been able to apply for operations at room temperature. It is essential to increase the amorphous region of electrolytes to improve its ionic conductivity at room temperature and numerous studies have been attempted to improve the ionic conductivity by reducing the crystallinity of polymer electrolytes.

Examples of the above-mentioned methods are: a method of blending an electrolyte with an amorphous polymer, decreasing crystallinity of a polymer backbone by adding a plasticizer (Electrochim. Acta, 40, 2315 (1995)), a method of enhancing ionic conductivity of an electrolyte by reducing crystallinity by binding a low molecular weight ethylene oxide as a side chain to the main backbone of the atypical polymer (J. Electrochem. Soc., 144, 1174 (1997), J. Polym. Sci., Part A, Polym. Lett., 28, 187 (1990)), a method of enhancing ionic conductivity of an electrolyte by grafting a low molecular weight PEO to a polymer having a network structure (Eur. Polym. J., 29, 799 (1993)), a method of manufacturing cross-linked polymer electrolytes from a composition, which comprises acrylate of polyalkyleneglycol having an unsaturated functional group and is mixed with an ion conductive liquid or electrolyte salt, by curing via UV or electron-beam irradiation (U.S. Pat. No. 4,830,939, J. Electrochem. Soc., 145, 1521 (1998)) and the like.

However, these solid polymer electrolytes with comb-type or network structures have ionic conductivity at room temperature as low as about $10^{-5}$ to $10^{-4}$ S/cm and also had poor mechanical properties when formed in films.

The studies for improving ionic conductivity and mechanical properties of electrolytes have been pursued, and as a result, a solid polymer electrolyte with an improved ionic conductivity was developed by adding a low molecular weight polyethylene oxide to a vinylfluoride-hexafluoropropane copolymer (Chem. Mater., 9 (1997) 1978). Further, it was reported that an electrolyte was improved of its inflammability and ionic conductivity at room temperature to $4 \times 10^{-5}$ S/cm using siloxane polymer, wherein polyethylene oxide is grafted as a side chain, as a plasticizer thereby inducing to have a structure of an interpenetrating polymer network (IPN) with polyethylene glycol diacrylate (Electrochim. Acta, 48, 2215 (2003), J. Power Sources, 119-121, 442 (2003)). Besides, the inventors of the present invention disclosed solid polymer electrolytes with improved mechanical properties by using a cross-linker wherein three ethyleneglycol acrylates are introduced to the center of cyclic alkyl, heterocyclic molecules (Korean Pat. Nos. 298, 802 & 394,077).

Polysiloxane-based polymers have relatively high plasticity and low glass transition temperature and are thus expected to improve the segmental motion of polymer chain. Therefore, there have been studies recently on how to apply those polysiloxane-based polymers to the basic backbone of the crosslinkable and comb-type polymer electrolytes of polyalkyleneoxide (Macromol. Chem. Rapid Commun., 7 (1986) 115, Macromolecules, 36 (2003), 9176, U.S. Pat. Nos. 4,673,718, 4,766,185, 5,227,043, 5,440,011, Japanese Laid-Open Hei 5-290616).

However, the polysiloxane-based polymers are known disadvantageous in that they have poor mechanical properties, low ionic conductivity of $10^{-4}$ S/cm thus not suitable to be used for lithium batteries which are used at room temperature.

As a way to solve the above problems, the inventors of the present invention have previously disclosed a method to remedy the poor mechanical properties of the polysiloxane-based polymers by using a novel cross-linker wherein a crosslinkable acryl group is introduced to both terminal ends of methylsiloxane polymer, having polyalkyleneoxide introduced as a side chain, by means of heat or light (Korean Pat. No. 419,864). Although the polymer electrolyte composition disclosed in the above Korean patent was remarkable it had also shortcomings that the cross-linking density and the mechanical properties of thus obtained electrolytes were not easy to control upon necessity because the acryl group is present only at terminal ends of methylsiloxane polymer.

SUMMARY OF THE INVENTION

To solve the above problems, the inventors of the present invention have conducted extensive researches and finally discovered that polysiloxane-based polymers, which are not only able to provide easy cross-linking but also enable to control the cross-linking density according to the concentration of an acryl group, can be synthesized by introducing a polyalkyleneoxide group and an acryl group as side chains to the backbone of methylsiloxane polymer.

Therefore, an object of the present invention is to provide a polysiloxane-based polymer wherein a polyalkyleneoxide group and an acryl group are introduced simultaneously to the backbone of methylsiloxane polymer as side chains.

Another object of the present invention is to provide a solid polymer electrolyte composition comprising the above-mentioned polysiloxane-based polymer as a cross-linker.

A still further object of the present invention is to provide a use of the above-mentioned solid polymer electrolyte composition as electrolyte thin film as well as polymer electrolyte for lithium-polymer secondary batteries.

BRIEF DESCRIPTION OF THE DRAWINGS

The above and other objects and features of the present invention will become apparent from the following description of the invention, when taken in conjunction with the accompanying drawings, wherein.

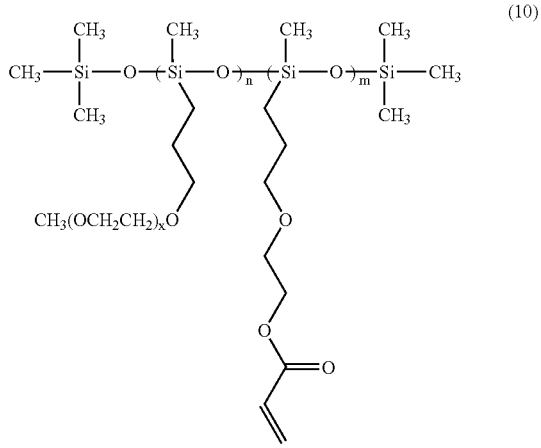

PSi-g-PEG-co-EA

Figure 2:
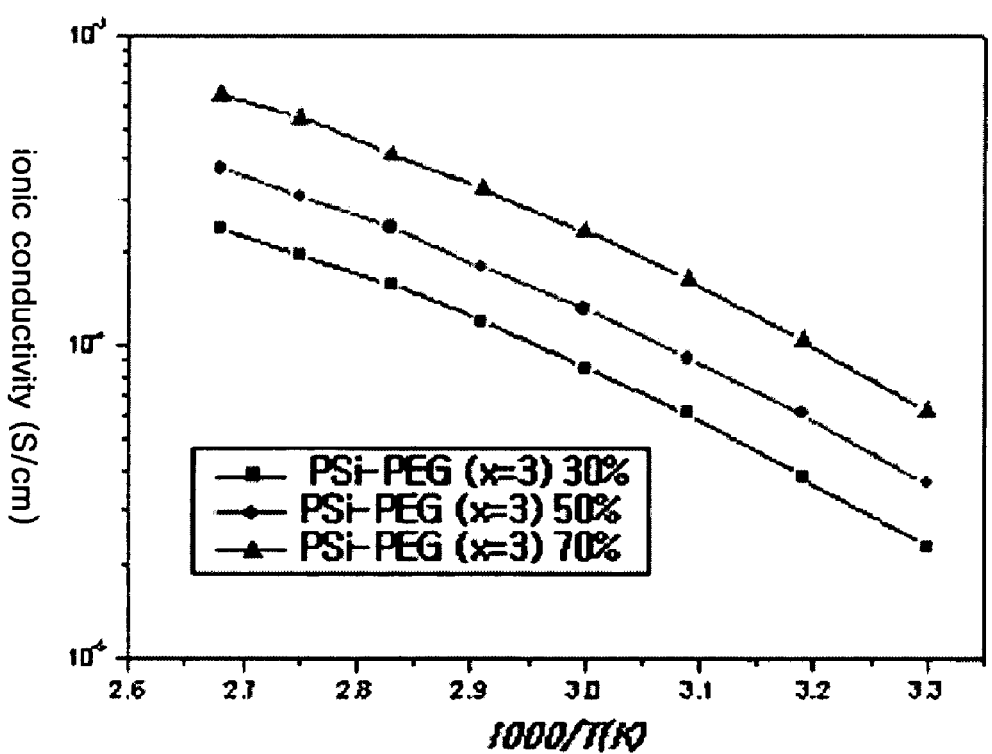
Figure 3:
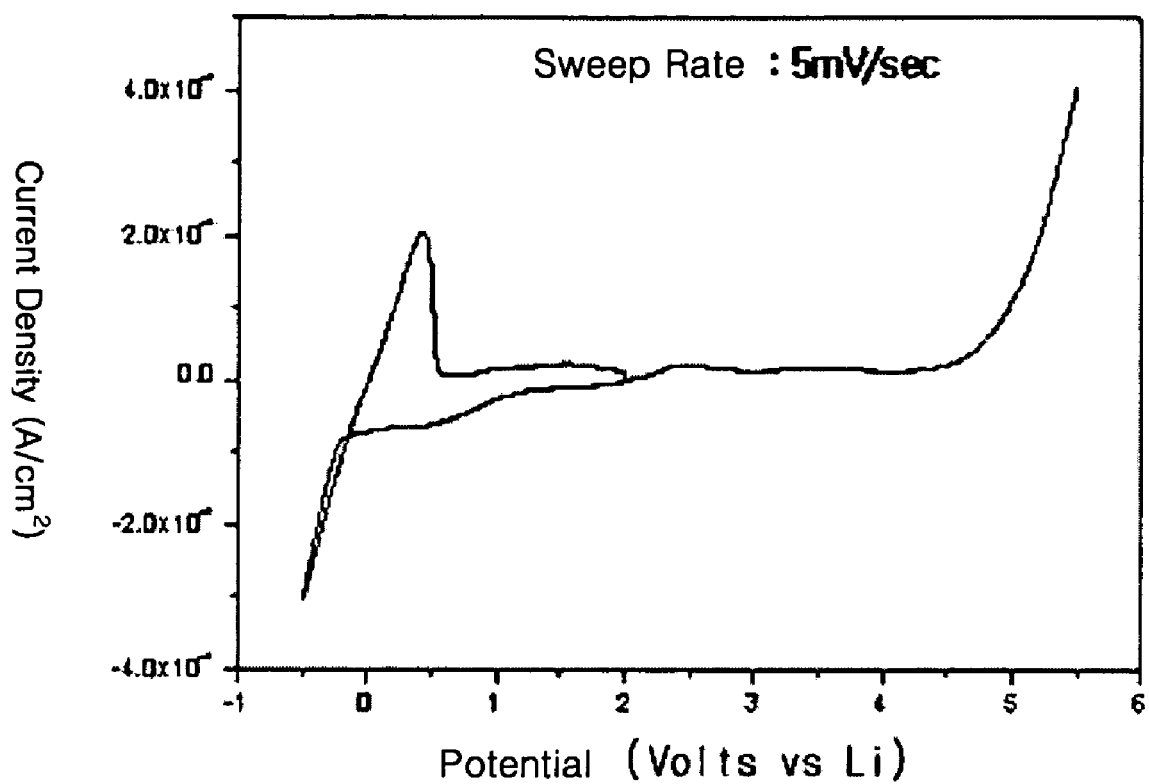

FIG. 2 shows the temperature dependence of ionic conductivity of a solid polymer electrolyte, wherein PSi-g-PEG-co-EA (x=3) is used as a cross-linker and PSi-PEG is used as a plasticizer; and FIG. 3 shows the electrochemical stability of the solid polymer electrolyte according to the present invention is evaluated by means of the linear sweep voltammetry.

DETAILED DESCRIPTION OF PREFERRED EMBODIMENTS

This invention relates to a polysiloxane-based compound and a solid polymer electrolyte composition using the same. More specifically, this invention relates to a polysiloxane-based compound wherein a polyalkyleneoxide group and an acryl group are introduced as side chains to the backbone of methylsiloxane polymer thereby facilitating easy cross-linking and capable of adjusting the cross-linking density according to the concentration of the above-mentioned acryl group. Further, this invention also relates to a solid polymer electrolyte composition which, due to the improved electrochemical stability and ionic conductivity at room temperature provided by using the above-mentioned polysiloxane-based compound, can easily control mechanical properties and also can be used in manufacturing electrolyte thin films, polymer electrolytes for small-sized and large capacity lithium secondary batteries.

The present invention relates to a polysiloxane-based compound having the following structure 1 wherein a polyalkyleneoxide group and an acryl group are introduced as side chains to the backbone of methylsiloxane polymer,

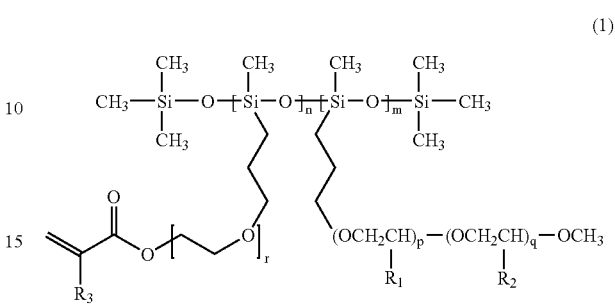

wherein $R_1$, $R_2$ and $R_3$ are independently a hydrogen atom or a methyl group; n and m are independently an integer of from 1 to 1,000; p and q are independently an integer of from 0 to 20 with the proviso that p and q are not 0 simultaneously; and r is an integer of from 1 to 20.

The present invention is described in greater detail as set forth hereunder.

The present invention relates to a polysiloxane-based polymer, which promotes easy cross-linking and also enables to control the level of cross-linking according to the conocentration of an acryl group by introducing a polyalkyleneoxide group and an acryl group are introduced as a side chain, respectively, to the backbone of methylsiloxane polymer.

Further, the present invention relates to a solid polymer electrolyte composition which uses the above-mentioned polysiloxane-based polymer as a cross-linker thus greatly increasing its compatibility with other components of an electrolyte such as a plasticizer, a lithium salt and a curable initiator thereby improving ionic conductivity at room temperature and electrochemical stability and also enabling to control with easiness mechanical properties of electrolytes by means of control of the cross-linking density of the polysiloxane-based polymer.

The polysiloxane-based polymer of the present invention having the above structure 1 can be synthesized by four different methods.

Method 1: As shown in the following reaction scheme 1a, tetramethyl tetra(polyalkyleneoxide) cyclotetrasiloxane(D4-PEGMP) of the following structure 4a is synthesized using tetramethyl cyclotetrasiloxane(D4H) of the following structure 6 as a starting material. Then, hexamethyldisiloxane ($M_2$) of the following structure 5 as a terminator is added thereto and allowed to react with tetramethyl tetra(ethoxyacrylate) cyclotetrasiloxane(D4A) of the following structure 4b using sulfuric acid as a catalyst to finally synthesize the polysiloxane-based polymer of the present invention.

Method 2: As shown in the following reaction scheme 1b, polymethyl (polyalkyleneoxide)siloxane(PSi-g-PEG) of the following structure 7 is synthesized using polyhydromethylsiloxane(PHMS) of the following structure 3a as a starting material. Then, the compound is allowed to react with tetramethyl tetra(ethoxyacrylate) cyclotetrasiloxane(D4A) of the following structure 4b using sulfuric acid as a catalyst to finally synthesize the polysiloxane-based polymer of the present invention.

Method 3: As shown in the following reaction scheme 1c, polymethyl (polyalkyleneoxide-co-ethoxyethanol)siloxane (PSi-g-(PEG-co-OH)) of the following structure 8a is synthesized using polyhydromethylsiloxane(PHMS) of the following structure 3b as a starting material. Then, the compound is allowed to react with acroyl chloride using a base as a catalyst to finally synthesize the polysiloxane-based polymer of the present invention.

Method 4: As shown in the following reaction scheme 1d, polymethyl (polyalkyleneoxide-co-ethoxyacetate)siloxane (PSi-g-PEG-co-EAc)) of the following structure 9 is synthesized using polyhydromethylsiloxane(PHMS) of the following structure 3c as a starting material. Then, the compound is converted into polymethyl (polyalkyleneoxide-co-ethoxyethanol)siloxane(PSi-g-(PEG-co-OH)) of the following structure 8b using a NaOH catalyst and then allowed to react with acroyl chloride using a base as a catalyst to finally synthesize the polysiloxane-based polymer of the present invention.

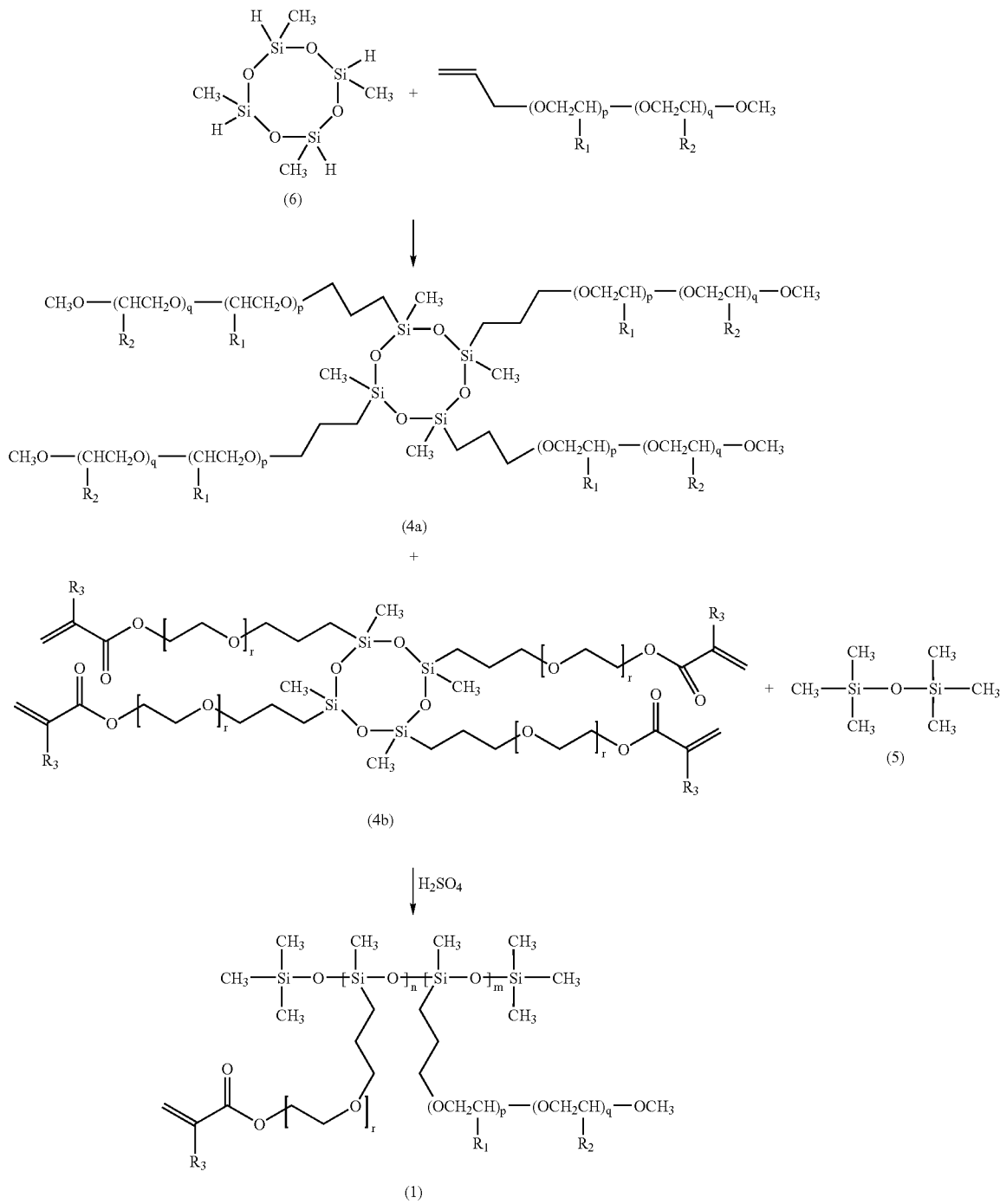

In the above reaction scheme 1a, $R_1$, $R_2$, $R_3$, m, n, p, q and r are the same as defined above.
[Reaction Scheme 1b]
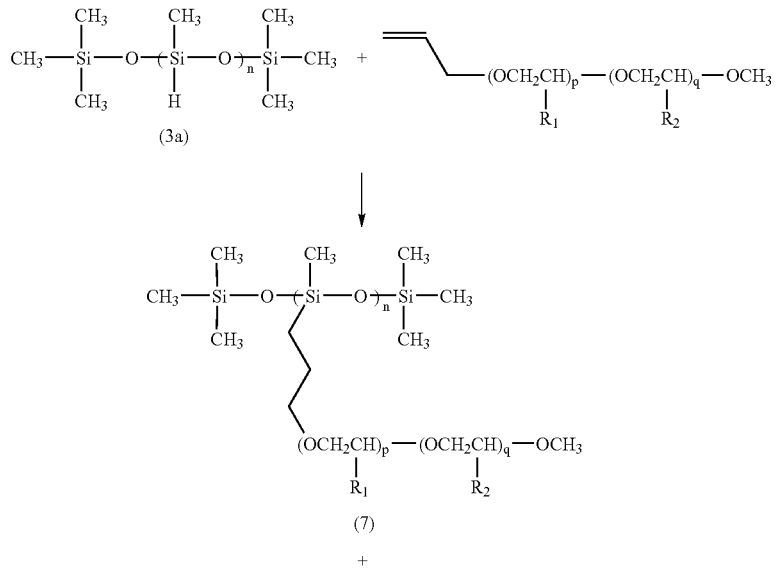
(3a)
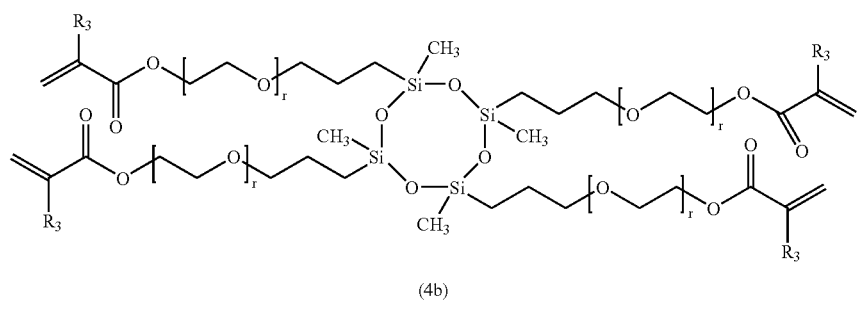
(7)
+
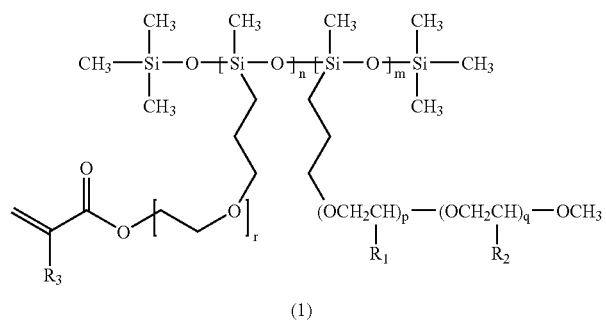
(4b)
$\downarrow$ $H_2SO_4$
(1)

In the above reaction scheme 1b, $R_1$, $R_2$, $R_3$, m, n, p, q and r are the same as defined above.
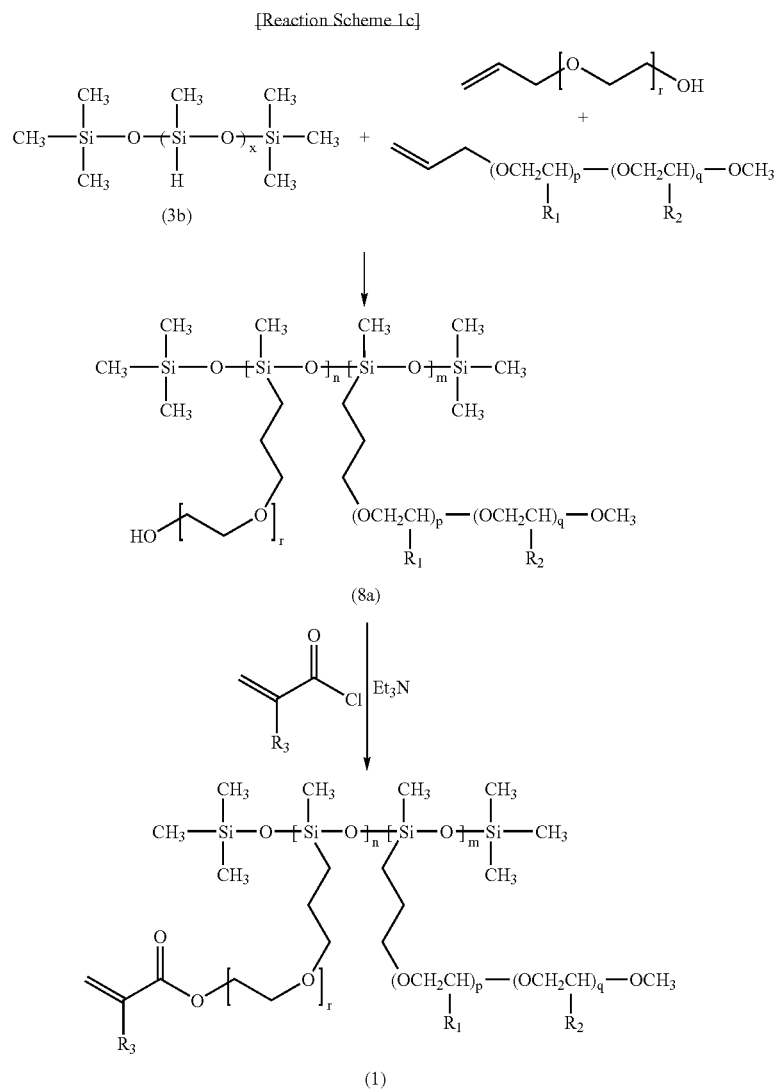
[Reaction Scheme 1c]
In the above reaction scheme 1c, $R_1$, $R_2$, $R_3$, m, n, p, q and r are the same as defined above, and x=m+n.
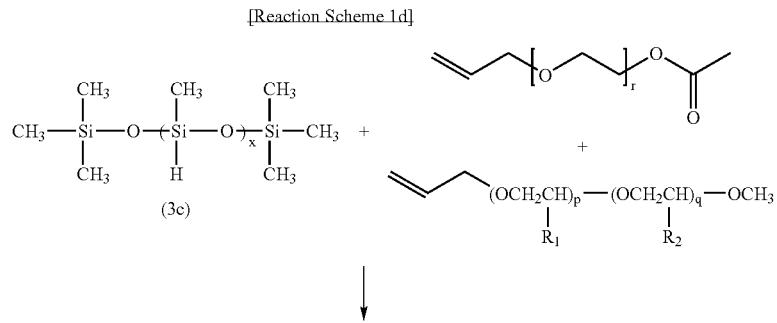
[Reaction Scheme 1d]

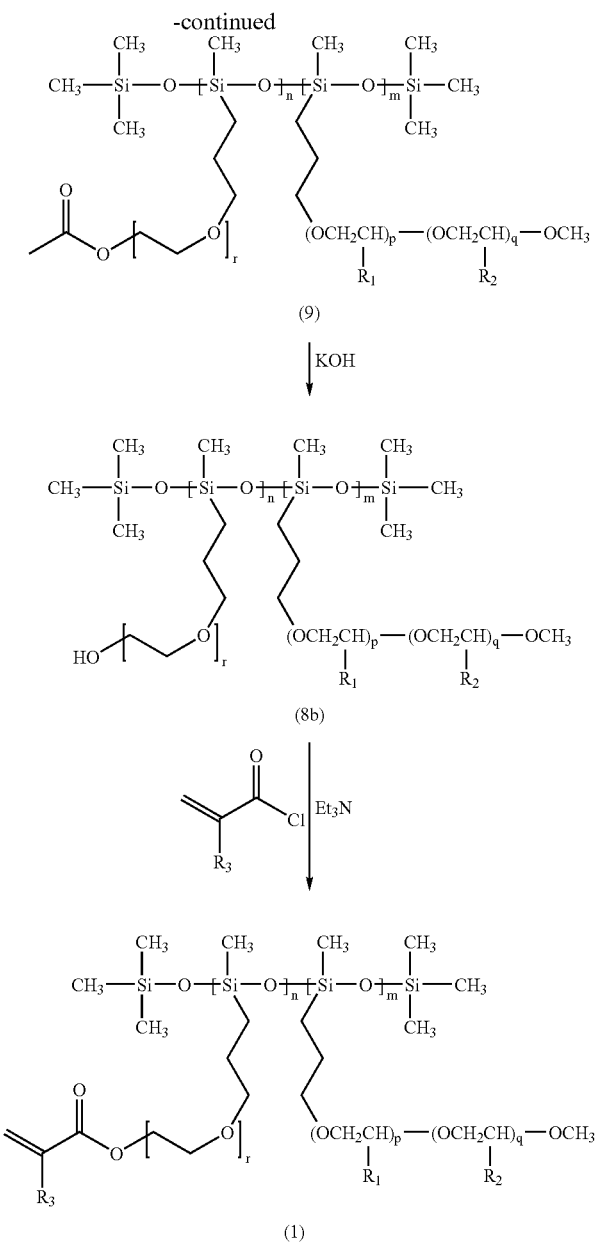

In the above reaction scheme 1d, $R_1$, $R_2$, $R_3$, m, n, p, q and r are the same as defined above, and x=m+n The polysiloxane-based compound of the present invention having the chemical structure of the above structure 1 can be used as a cross-linker to improve mechanical properties such as hardness and elasticity of polymers such as rubber and plastic materials as well as other fields where chemical or electrochemical stabilities are required.

The polysiloxane-based compound of the present invention is preferably used as a cross-linker for polymer electrolyte composition of small-sized or large capacity lithium-polymer secondary batteries as well as electrolyte thin films. Accordingly, the electrolyte composition comprising the polysiloxane-based compound of the present invention having the structure of the above structure 1 can be used to manufacture electrolyte thin films and polymer electrolytes of lithium-polymer secondary batteries.

The solid polymer electrolyte composition of the present invention comprises a cross-linker, a plasticizer, a lithium salt and a curable initiator.

Examples of the above cross-linker are the polysiloxane-based compounds of the present invention having the structure of the above structure 1. The polysiloxane-based compounds are advantageous in that the methylsiloxane polymer in its backbone has a flexibility thus imparting improved mechanical properties such as elongation and bending of electrolytes while the polyalkyleneoxide group introduced at a side chain has improved compatibility with a plasticizer, which is used for the purpose of increasing ionic conductivity of electrolytes. In addition, the polysiloxane-based compound is further introduced with an acryl group which allows the polymer electrolyte to form a three-dimensional network structure and is also manufacture electrolytes that can control mechanical properties of electrolytes by means of controlling the concentration of an acryl group.

The above acryl group can be contained in the range of about 0.1 to 95 wt. % based on the total polymer electrolyte composition, preferably about 0.5 to 80 wt. %, more preferably about 0.5 to 60 wt. % .

The plasticizer serves to enhance dissociation of a lithium salt and the mobility of lithium ions thereby increasing ionic conductivity. The plasticizer to be used in the present invention are one or more selected from the group consisting of polyalkyleneglycol dialkylether of the following structure 2, polymethyl(polyalkyleneoxide)siloxane of the following structure 3, and a non-aqueous polar solvent.

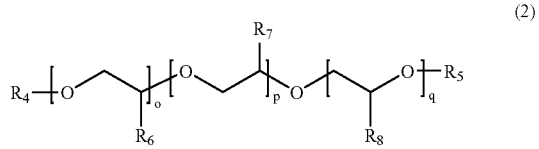

(2)

In the above structure 2, $R_4$ and $R_5$ are independently a $C_1$-$C_{10}$ linear or branched alkyl group; $R_6$, $R_7$ and $R_8$ are independently a hydrogen atom or a methyl group; o, p and q are independently an integer of from 0 to 20 with the proviso that o, p and q are not 0 simultaneously.

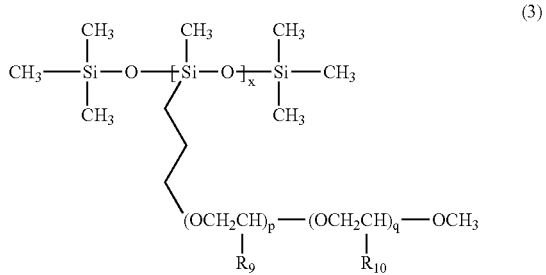

(3)

In the above structure 3, $R_9$ and $R_{10}$ are independently a hydrogen atom or a methyl group; x is an integer of from 1 to 1,000; p and q are independently an integer of from 0 to 20 with the proviso that p and q are not 0 simultaneously.

Examples of polyalkyleneglycol dialkylether to be used in the present invention are polyethyleneglycol dimethylether, polyethyleneglycol diethylether, polyethyleneglycol dipropylether, polyethyleneglycol dibutylether, polyethyleneglycol diglycidylether, polypropyleneglycol dimethylether, polypropyleneglycol diglycidylether, polypropyleneglycol/polyethyleneglycol block copolymer dibutylether, polyethyleneglycol/polypropyleneglycol/polyethyleneglycol block copolymer dibutylether and the like.

Examples of a non-aqueous polar solvent to be used in the present invention are ethylenecarbonate, propylenecarbonate, butylenecarbonate, dimethylcarbonate, tetrahydrofuran, 2-methyltetrahydrofuran, 1,3-dioxirane, 4,4-dimethyl-1,3-dioxirane, γ-butylolactone, acetonitrile and the like.

The amount of a plasticizer to be contained in the electrolytes are directly proportional to the ionic conductivity of polymer electrolytes. However, if the content of a plasticizer in the electrolytes is too high it deteriorates the mechanical properties of the resulting electrolytes and thus they cannot be used to manufacture thin films and cannot be used for manufacturing batteries as well. Therefore, a plasticizer is contained in the electrolytes in the range of about 0.1 to 95 wt. % based on the total electrolyte composition, preferably about 0.1 to 90 wt. %. When a plasticizer is contained in the electrolytes within the above range the electrolytes resulted therefrom can be used to manufacture thin films of less than 100 μm in thickness.

As for a lithium salt to be used in the present invention, there is practically no limitation as long as it can be used for manufacturing polymer electrolytes. Examples of the typical lithium salts are $LiClO_4$, $LiCF_3SO_3$, $LiBFS_4$, $LiPF_6$, $LiAsF_6$, $Li(CF_3SO_2)_2N$.

Lithium salts are used in the present invention in the range of about 3 to 40 wt. % based on the total polymer electrolyte composition, preferably about 5 to 25 wt. %. However, its content can be adjusted upon necessity according to the appropriate mixing ratio.

As for the curable initiator, both photo curing and thermal curing initiators can be used in the present invention.

Examples of photo curing initiators are ethylbenzoin ether, isopropylbenzoin ether, α-methylbenzoin ethylether, benzoin phenylether, α-acyloxime ester, α,α-diethoxy acetophenone, 1,1-dichloroacetophenone, 2-hydroxy-2-methyl-1-phenylpropane-1-on(Darocur 1173, Ciba Geigy), 1-hydroxycyclohexyl phenyl ketone(Irgacure 184, Ciba Geigy), Darocur 1116, Irgacure 907, etc., anthraquinone, 2-ethyl anthraquinone, 2-chloro anthraquinone, thioxantone, isopropyl thioxantone, chloro thioxantone, benzophenone, p-chlorobenzophenone, benzyl benzoate, benzoyl benzoate, Michler's ketone and the like.

Examples of thermal curing initiators are azoisobutyronitriles, peroxides and the like.

Initiators can be contained in the total polymer electrolyte composition in the range of about 0.1 to 5 wt. %, and its content can be adjusted considering the appropriate mixing ratios with other components such as oligomers and polymers.

In an embodiment, the present invention provides a solid polymer electrolyte composition which can be used as a polymer electrolyte for lithium-polymer secondary batteries as well as thin films.

A method of manufacturing the above electrolyte thin film using the above solid polymer electrolyte composition is disclosed hereunder. First, a plasticizer and a lithium salt in a suitable mixing ratio are added into a container and mixed by adding a cross-linker. The mixture is then added with a curable initiator and stirred to obtain a liquid composition mixture for manufacturing solid polymer electrolyte. Thus prepared liquid composition mixture is coated with a proper thickness on the surfaces of supports such as a glass plate, polyethylene-based vinyl or commercial Mylar films or battery electrodes and cured by using an irradiator for applying electron beam, UV, gamma rays or heat.

Another method of manufacturing the above electrolyte thin film with a suitable thickness using the above solid polymer electrolyte composition is as follows. The composition mixture is coated on the surface of a support and the both ends of the support is fixed using thickness-controlling spacers and then covered with another support. Then, a curing is preformed by using an irradiator for curing or a heat source.

In another embodiment, the present invention provides a method for manufacturing polymer electrolytes for lithium-polymer secondary batteries using the above-mentioned solid polymer electrolyte composition of the present invention.

Lithium-polymer secondary batteries consist of an anode, electrolyte and a cathode. In general, anodes are prepared by using lithium metal oxides such as $LiCoO_2$, $LiNiO_2$ and the like, while cathodes are prepared by using graphites such as MCMB, MPCF, etc., or carbons such as cokes or lithium metals.

An electrolyte solution prepared by mixing a cross-linker, a plasticizer, a lithium salt and a curable initiator is placed into a substrate to form a film with a predetermined thickness. The film is cured for a predetermined length of time and a polymer electrolyte film is obtained.

Lithium-polymer secondary batteries can be also manufactured by other conventional methods.

As stated above, the present invention employs the polysiloxane-based compound as a cross-linker for a solid polymer electrolyte composition and thereby improves mechanical properties and ionic conductivity of thus prepared electrolytes. Further, the level of cross-linking can be adjusted according to the concentration of an acryl group thereby easily controlling the mechanical properties of electrolytes.

The present invention will be further explained with the accompanying examples, however, they should not be construed as limiting the scope of this invention.

PREPARATION EXAMPLE 1

Synthesis of Tetramethyl tetra(polethyleneoxide)cyclotetrasiloxane (D4-PEGMP)

To a 1,000 mL three-necked flask equipped with a stirrer, a thermometer, and a dropping funnel, 550 mL of THF dried with Na, 9.6 g of NaOH (0.2 mol) and 32.84 g (0.2 mol) of tri(ethyleneglycol) monomethyl ether(TEGMe, Mw=164.2) were added and then dropwisely added with an excessive amount of allylbromide [29.04 g (0.2 mol)] and the refluxed for 12 hrs under nitrogen atmosphere.

Upon completion of the reaction, the remaining NaOH and thus obtained NaBr were filtered out and then THF was removed under reduced pressure. The residual reactant was dissolved in chloroform or methylene chloride and then extracted 3 times with 5 wt. % NaOH aqueous solution and the organic layer was dried using $MgSO_4$ and then further dried under vacuum to obtain 30 g of tri(ethyleneglycol) monomethyl monoallylether (TEGM164Ae (x=3), Mw=204.27) (Yield: 73%).

$^1$H-NMR(300 MHz, $CDCl_3$): ppm 3.37(s, 3H), 3.54-3.67 (m, 12H), 4.02(d, 2H), 5.25(m, 2H), 5.90(m, 1H)

In a 1,000 mL three-necked flask, 2,4,6,8-tetramethyl cyclotetrasiloxane(D4H) (3 g, 0.0125 mol) was dissolved in 50 mL of toluene, added with Pt(0)-1,3-divinyl-1,1,3,3-tetramethyldisiloxane as a catalyst and then dropwisely added with TEGM164Ae (x=3) (11.21 g, 0.055 mol) after dissolving it in 50 mL of toluene. The mixture was refluxed for 12 hrs under nitrogen atmosphere. It was then cooled down to room temperature, stirred after adding active carbon, filtered and evaporated under reduced pressure to obtain about 12.85 g of D4-PEGMP (x=3) (Yield: 97.4%).

$^1$H-NMR(300 MHz, $CDCl_3$): ppm 0.00(s, 3H), 0.40-0.45 (m, 2H), 1.49-1.59(m, 2H), 3.31-3.60(m, 17H)

In the same way as above, 43.75 g of poly(ethyleneglycol) monomethyl ether (Mw 350) and 18.15 g of allylbromide were reacted and 36.80 g of poly(ethyleneglycol)monomethyl monoallylether (PEGM350Ae (x=7.2), Mw=350) was obtained (Yield: 75.4%).

$^1$H-NMR(300 MHz, $CDCl_3$): ppm 3.52(s, 3H), 3.66-3.86 (m, 28.8H), 4.14-4.18(d, 2H), 5.25-5.50(m, 1H), 5.95-6.15 (m, 2H)

In the same way as above, 3 g of D4H and 30.8 g of PEGM350Ae (x=7.2) were reacted and 29.2 g of D4-PEGMP (x=7.2) was obtained (Yield: 89.0%).

$^1$H-NMR(300 MHz, CDCl$_3$): ppm 0.00(s, 3H), 0.39-0.43 (m, 2H), 1.50-1.62(m, 2H), 3.31-3.59(m, 33.8H)

PREPARATION EXAMPLE 2

Synthesis of Tetramethyl tetra(ethoxyarylate)cyclotetrasiloxane (D4A) Monomer

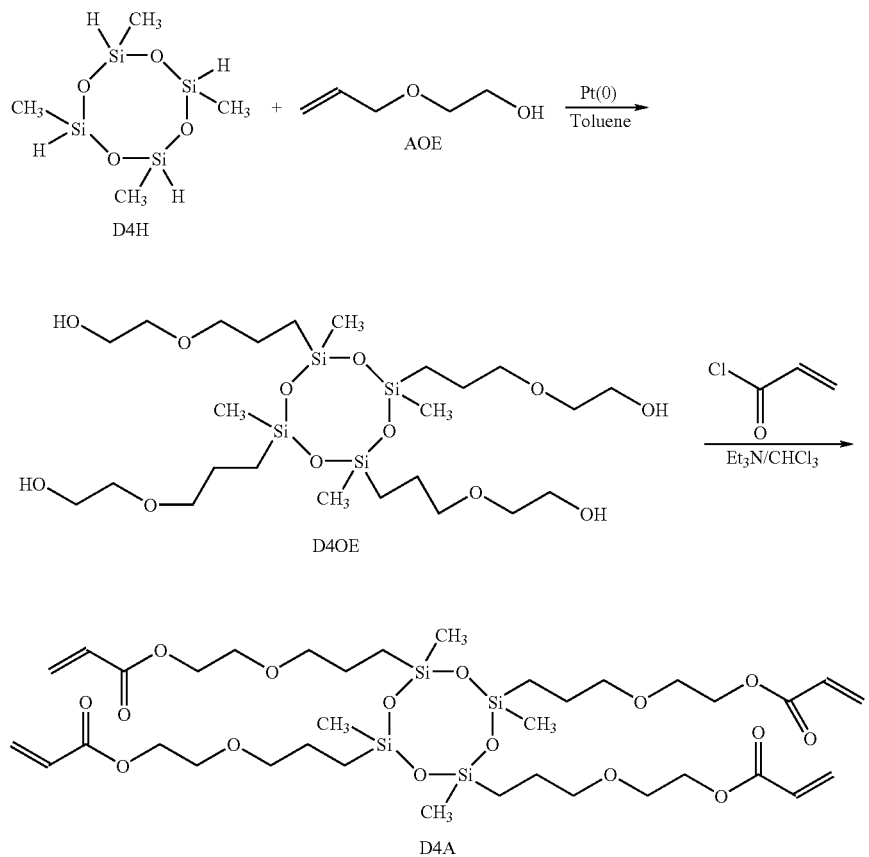

In a three-necked flask, 2,4,6,8-tetramethyl cyclotetrasiloxane(D4H) (10 g, 0.0426 mol) was dissolved in 100 mL of toluene, added with Pt(0) catalyst and then dropwisely added with allyloxyethanol(AOE, 18.68 g, 0.17 mol) after dissolving it in 150 mL of toluene. The mixture was refluxed for 12 hrs under nitrogen atmosphere. It was then cooled down to room temperature, stirred after adding active carbon, filtered and evaporated under reduced pressure to obtain about 24 g of D4-2,4,6,8-tetra(ethoxyethanol) (D4OE) (Yield: 90%).

$^1$H-NMR (300 MHz, CDCl$_3$): ppm 0.00(s, 3H), 0.39-0.43 (m, 2H), 1.50-1.62(m, 2H), 2.6(s, 1H), 3.31-3.47(m, 4H), 3.65(d, 2H)

In a three-necked flask, the above D4OE (6 g, 0.00925 mol) and triethylamine (4.5 g, 0.037 mol) were dissolved in 100 mL of CHCl$_3$ and then stirred at 0° C. while dropwisely adding acryloyl chloride (4 g, 0.037 mol) after dissolving it in 100 mL of CHCl$_3$. After 12 hrs of reaction, the resulting precipitate was removed and evaporated under reduced pressure. The resulting yellow viscous liquid product was dissolved in chloroform and then extracted a few times with water. The resulting chloroform layer was separated, dried with MgSO$_4$ and then evaporated under reduced pressure to obtain about 6 g of tetramethyl tetra(ethoxyarylate) cyclotetrasiloxane (D4A) (Yield: 75%).

$^1$H-NMR (300 MHz, CDCl$_3$): ppm 0.00(s, 3H), 0.39-0.53 (m, 2H), 1.5-1.6(m, 2H), 3.25-3.43(m, 2H), 3.52-3.67(m, 2H), 4.17-4.3(m, 2H), 5.7-5.85(d, 2H), 6.0-6.2(m, 2H), 6.3-6.45(d, 2H).

PREPARATION EXAMPLE 3

Synthesis of Poly[methyl(polyethylene oxide)siloxane] (PSi-g-PEG)

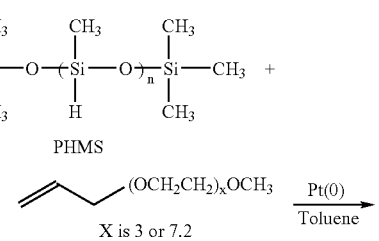

-continued

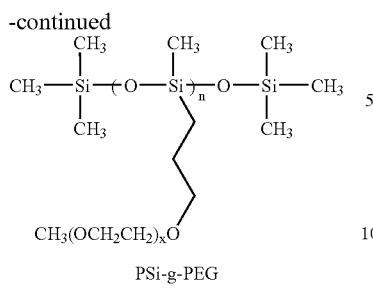

PSi-g-PEG

In a three-necked flask, polyhydromethylsiloxane(PHMS) (5 g, 0.002934 mol) was dissolved in 100 mL of toluene, added with Pt(0) catalyst and then dropwisely added with tri(ethyleneglycol) monomethyl monoallylether (TEGM164Ae) (17 g, 0.103 mol) after dissolving it in 150 mL of toluene. The mixture was refluxed at 115° C. for 12 hrs under nitrogen atmosphere. It was then cooled down to room temperature, stirred after adding active carbon, filtered and evaporated under reduced pressure to obtain about 17 g of polymethyl(polyalkyleneoxide) siloxane (PSi-g-PEG, x=3) (Yield: 90%).

$^1$H-NMR(300 MHz, CDCl$_3$): ppm 0.00(s, 28H), 0.39-0.43(m, 13H), 1.50-1.62(m, 13H), 3.31-3.60(m, 12OH).

In the same way as above, 5 g of PHMS and 30 g of PEGM350Ae were reacted and 25 g of poly[methyl(polyethyleneoxide)siloxane] (PSi-g-PEG, x=7.2) was obtained (Yield: 80.0%).

$^1$H-NMR(300 MHz, CDCl$_3$): ppm 0.00(s, 36H), 0.39-0.43(m, 14H), 1.50-1.62(m, 15H), 3.31-3.59(m, 300H)

PREPARATION EXAMPLE 4

Synthesis of Allyloxyethanol acetate(AOEA)

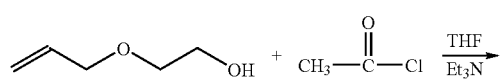

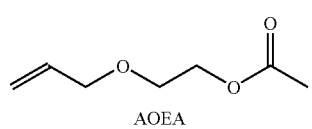

AOEA

In a three-necked flask, allyloxyethanol (15 g, 0.147 mol) and triethylamine (16.4 g, 0.16 mol) were dissolved in 150 mL of THF, and then stirred at 0° C. while dropwisely adding acetylchloride (12.68 g, 0.16 mol) after dissolving it in 100 mL of THF. After 12 hrs of reaction, the resulting precipitate was removed and evaporated under reduced pressure. The resulting yellow viscous liquid product was dissolved in chloroform and then extracted a few times with water. The resulting chloroform layer was separated, dried with MgSO$_4$ and then evaporated under reduced pressure to obtain about 6 g of AOEA (Yield: 82%).

$^1$H-NMR(300 MHz, CDCl$_3$): ppm 2.8(s, 3H), 3.4(m,2H), 3.8(m, 2H), 4.0(m, 2H), 4.9-5.1(m, 2H), 5.6-5.8(m, 1H).

PREPARATION EXAMPLE 5

Synthesis of Poly[methyl(polyethyleneoxide-co-ethoxyacetate)siloxane] (PSi-g-PEG-co-EAc)

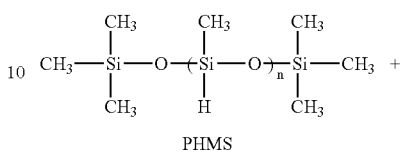

PHMS

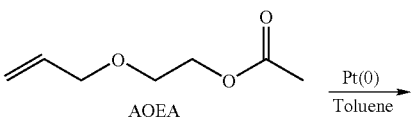

AOEA

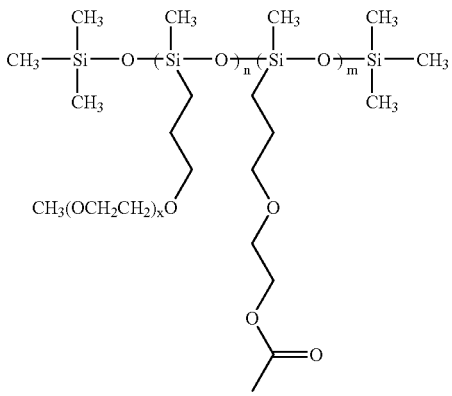

PSi-g-PEG-co-EAc

X is 3 or 7.2

In a three-necked flask, polyhydromethylsiloxane(PHMS) (1.5 g, 0.00088 mol) was dissolved in 50 mL of toluene, added with Pt(0) catalyst and then dropwisely added with tri(ethyleneglycol) monomethyl monoallylether (TEGM164Ae) (3.27 g, 0.016 mol) allyloxyethanol acetate (AOEA) (1.186 g, 0.00824 mol) after dissolving them in 100 mL of toluene. The mixture was refluxed at 115° C. for 12 hrs under nitrogen atmosphere. It was then cooled down to room temperature, stirred after adding active carbon, filtered and evaporated under reduced pressure to obtain about 5 g of poly[methyl(polyethyleneoxide-co-ethoxyacetate)siloxane] (PSi-g-PEG-co-EAc) (Yield: 85%). NMR analysis revealed that n+m=24 and n/m=3.5.

$^1$H-NMR(300 MHz, CDCl$_3$): ppm 0.0(s, 13H), 0.3-0.5(s, 6H), 1.4-1.6(s, 6H), 2(s, 3H), 3.2-3.7(m, 37H), 4.2(m, 2H).

In the same way as above, 1.5 g of polyhydromethylsiloxane(PHMS), 6.24 g of poly(ethyleneglycol) monomethyl monoallylether(PEGM350Ae (x=7.2)) and 1.2 g of AOEA were reacted and about 7 g of poly[methyl(polyalkyleneoxide-co-ethoxyacetate)siloxane] (PSi-g-PEG-co-EAc) was obtained (Yield: 75%). NMR analysis revealed that n+m=24 and n/m=3.7.

$^1$H-NMR(300 MHz, CDCl$_3$): ppm 0.0(s, 14H), 0.3-0.5(s, 6.4H), 1.4-1.6(s, 6.5H), 2(s, 3H), 3.2-3.7(m, 60H), 4.2(m, 2H).

EXAMPLE 1

Synthesis of Polysiloxane-based Compound
(Formula 1)

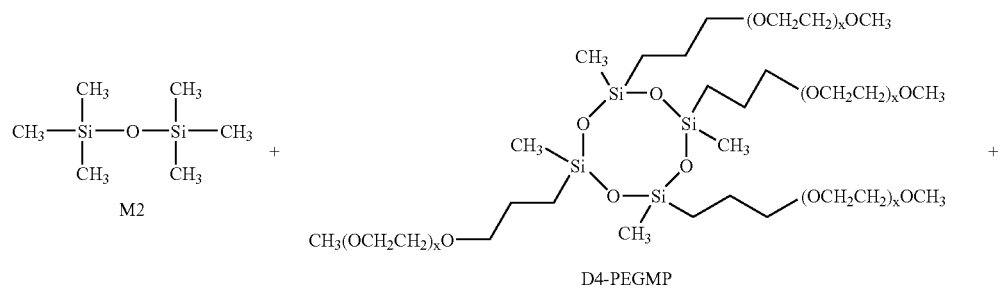

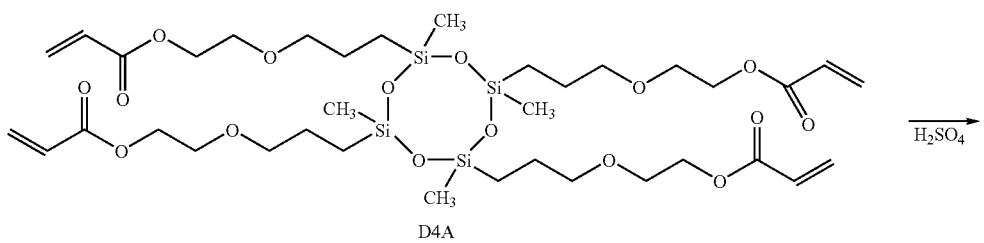

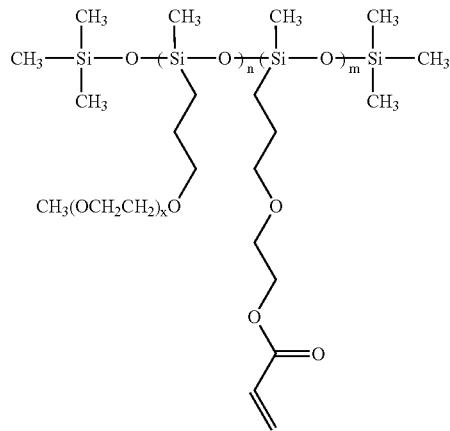

In a three-necked flask, D4-PEGMP (x=3) (4.567 g, 4.32 mmol), D4A (1.6 g, 1.85 mmol) and hexamethyldisiloxane (M$_2$) (0.2 g, 1.234 mmol) were added and then dropwisely added with 0.05 mL of sulfuric acid and allowed to react at 65° C. for 48 hrs while stirring. Distilled water in the amount of 0.05 mL was added thereto and then stirred for about 1.5 hr. The reaction product was added with 100 mL of chloroform and neutralized with 5 wt. % Na$_2$CO$_3$ aqueous solution. The neutralized reactant was dried with MgSO$_4$ and was added active carbon and then stirred for 12 hrs. The resulting precipitate was removed by filtration and evaporated under reduced pressure. The unreacted reactants were removed by using silica-gel column chromatography and finally obtained 3 g of PSi-g-PEG-co-EA (x=3) (Yield: 64%). NMR analysis revealed that n+m=15 and n/m=2.7.

$^1$H-NMR(300 MHz, CDCl$_3$): ppm 0.00-0.04(m, 22H), 0.40-0.45(m, 10H), 1.51-1.54(m, 10H), 3.31-3.60(m, 80H), 4.05(t, 2H), 5.77(d, 1H), 6.08(q, 1H), 6.38(d, 1H)

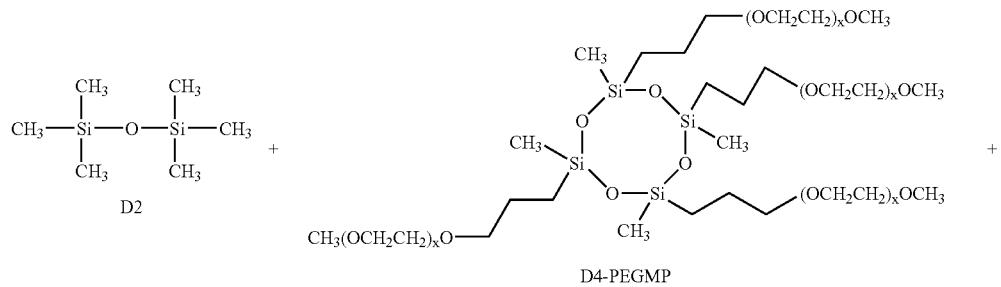
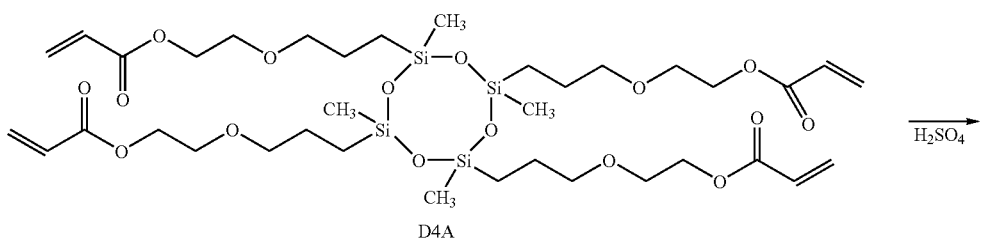
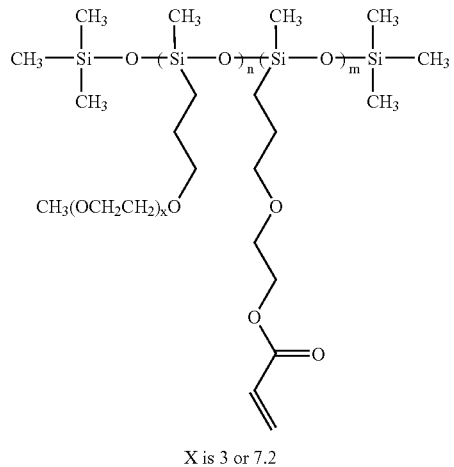
X is 3 or 7.2
In the same way as above, 7.75 g of D4-PEGMP (x=7.2) and 1.6 g of D4A and 0.2 g of hexamethyldisiloxane were reacted and about 4 g of PSi-g-PEG-co-EA (x=7.2) was obtained (Yield: 56%). NMR analysis revealed that n+m=14 and n/m=2.4.
$^1$H-NMR(300 MHz, CDCl$_3$): ppm 0.00-0.04(m, 22H), 0.40-0.45(m, 10H), 1.51-1.54(m, 10H), 3.31-3.60(m, 120H), 4.05(t, 2H), 5.77(d, 1H), 6.08(q, 1H), 6.38(d, 1H)

EXAMPLE 2

Synthesis of Polysiloxane-Based Compound
(Structure 1)

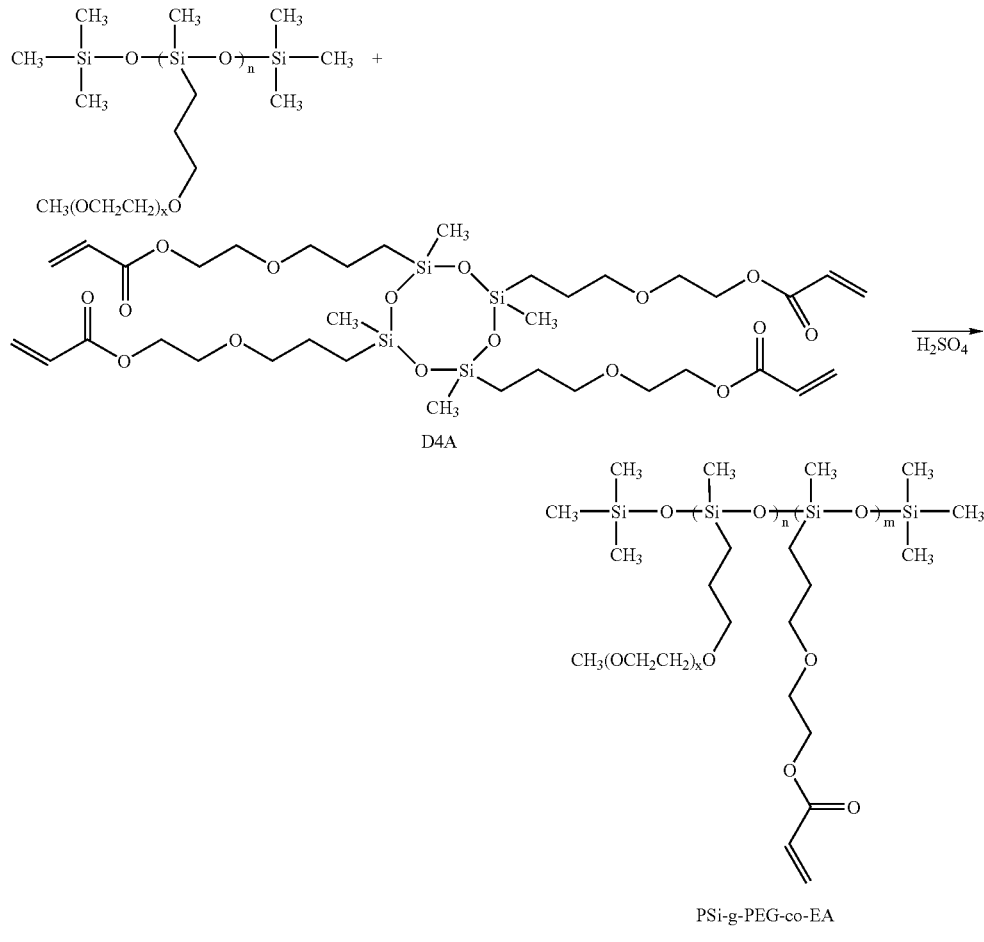

In a three-necked flask, PSi-g-PEG (x=3) (12 g, 1.89 mmol) and D4A (4 g, 4.6 mmol) were added and then dropwisely added with 0.08 mL of sulfuric acid and allowed to react at 65° C. for 48 hrs while stirring. Distilled water in the amount of 0.08 mL was added thereto and then stirred for about 1 hr. The reaction product was added with 100 mL of chloroform and neutralized with 5 wt. % Na2CO3 aqueous solution. The neutralized reactant was dried with MgSO4 and was added active carbon and then stirred for 12 hrs. The resulting precipitate was removed by filtration and evaporated under reduced pressure. The unreacted reactants were removed by using silica-gel column chromatography and finally obtained 7.4 g of PSi-g-PEG-co-EA (x=3) (Yield: 65%). NMR analysis revealed that n+m=17 and n/m=3.0.

$^1$H-NMR(300 MHz, CDCl$_3$): ppm 0.00-0.04(m, 22H), 0.40-0.45(m, 10H 1.51-1.54(m, 10H), 3.31-3.60(m, 80H), 4.05(t, 2H), 5.77(d, 1H), 6.08(q, 1H), 6.38(d, 1H)

In the same way as above, 12 g of PSi-g-PEG (x=7.2) and 2.45 g of D4A were reacted and about 6.6 g of PSi-g-PEG-co-EA (x=7.2) was obtained (Yield: 60%). NMR analysis revealed that n+m=15 and n/m=2.8.

$^1$H-NMR(300 MHz, CDCl$_3$): ppm 0.00-0.04(m, 21H), 0.40-0.45(m, 9H) 1.51-1.54(m, 9H), 3.31-3.60(m, 125H), 4.05(t,2H), 5.77(d,1H), 6.08(q, 1H), 6.38(d, 1H)

EXAMPLE 3

Synthesis of Polysiloxane-Based Compound
(Structure 1)

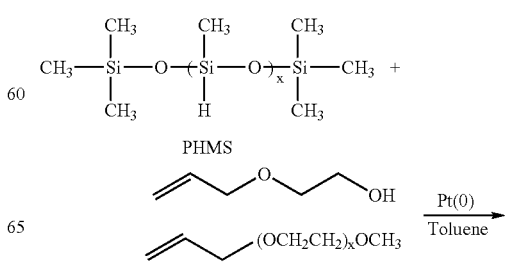

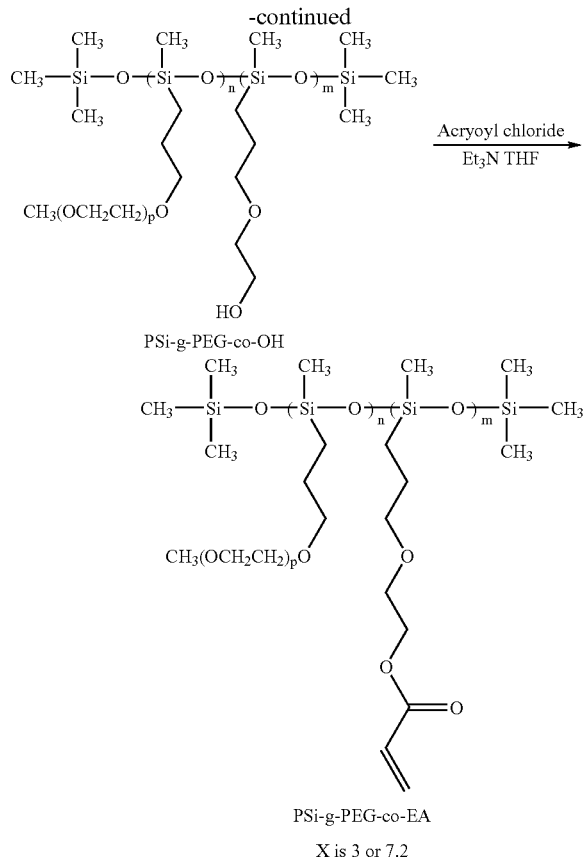

PSi-g-PEG-co-OH

PSi-g-PEG-co-EA

X is 3 or 7.2

In a three-necked flask, polyhydromethylsiloxane(PHMS) (5 g, 0.002934 mol) was dissolved in 100 mL of toluene, added with Pt(0) catalyst and then dropwisely added with tri(ethyleneglycol) monomethyl monoallylether (TEGM164Ae) (10.9 g, 0.0533 mol) allyloxyethanol (2.337 g, 0.0228 mol) after dissolving them in 150 mL of toluene. The mixture was refluxed for 12 hrs under nitrogen atmosphere. It was then cooled down to room temperature, stirred after adding active carbon, filtered and evaporated under reduced pressure to obtain about 16.2 g of poly[methyl (polyalkyleneoxide-co-ethoxyacetate)siloxane] (Psi-g-PEG-co-OH) (x=3) (Yield: 85%). NMR analysis revealed that n+m=24 and n/m=4.

$^1$H-NMR(300 MHz, CDCl$_3$): ppm 0.00-0.04(m, 3H), 0.40-0.45(s, 1.5H), 1.51-1.54(s, 1.5H), 2.9(s, 1H), 3.31-3.60 (m, 10H)

In the same way as above, 5 g of PHMS and 20.8 g of PEGM350Ae and allyloxy 2.34 g of ethanol were reacted and about 25 g of poly[methyl(polyalkyleneoxide-co-ethoxyethanol)siloxane] (Psi-g-PEG-co-OH) (x=7.2) was obtained (Yield: 85%). NMR analysis revealed that n+m=23 and n/m=4.1.

$^1$H-NMR(300 MHz, CDCl$_3$): ppm 0.00-0.04(m, 3H), 0.40-0.45(s, 1.5H), 1.51-1.54(s, 1.5H), 2.9(s, 1H), 3.31-3.60 (m, 18H)

In a three-necked flask, the above PSi-g-PEG-co-OH (x=3) (8 g, 0.001272 mol) and triethylamine (2 g, 0.0196 mol) were dissolved in 100 mL of THF, and then stirred at 0° C. while dropwisely adding acryloyl chloride (1.8 g, 0.02 mol) after dissolving it in 50 mL of THF. After 12 hrs of reaction, the resulting precipitate was removed and evaporated under reduced pressure. The resulting yellow viscous liquid product was dissolved in chloroform and then extracted a few times with water. The resulting chloroform layer was separated, dried with MgSO$_4$ and then evaporated under reduced pressure to obtain about 5.52 g of PSi-g-PEG-co-EA (x=3) (Yield: 69%). NMR analysis revealed that n+m=24 and n/m=4.0.

$^1$H-NMR(300 MHz, CDCl$_3$): ppm 0.00-0.04(m, 22H), 0.40-0.45(m, 10H), 1.51-1.54(m, 10H), 3.31-3.60(m, 80H), 4.05(t, 2H), 5.77(d, 1H), 6.08(q, 1H), 6.38(d, 1H)

In the same way as above, 5 g of PSi-g-PEG-co-OH (x=7.2), 3.53 g of triethylamine and 0.4 g of acryloyl chloride were reacted and about 3.1 g of PSi-g-PEG-co-EA (x=7.2) was obtained (Yield: 62%). NMR analysis revealed that n+m=23 and n/m=4.1.

$^1$H-NMR(300 MHz, CDCl$_3$): ppm 0.00-0.04(m, 22H), 0.40-0.45(m, 10H), 1.51-1.54(m, 10H), 3.31-3.60(m, 127H), 4.05(t, 2H), 5.77(d, 1H), 6.08(q, 1H), 6.38(d, 1H)

EXAMPLE 4

Synthesis of Polysiloxane-Based Compound (Formula 1)

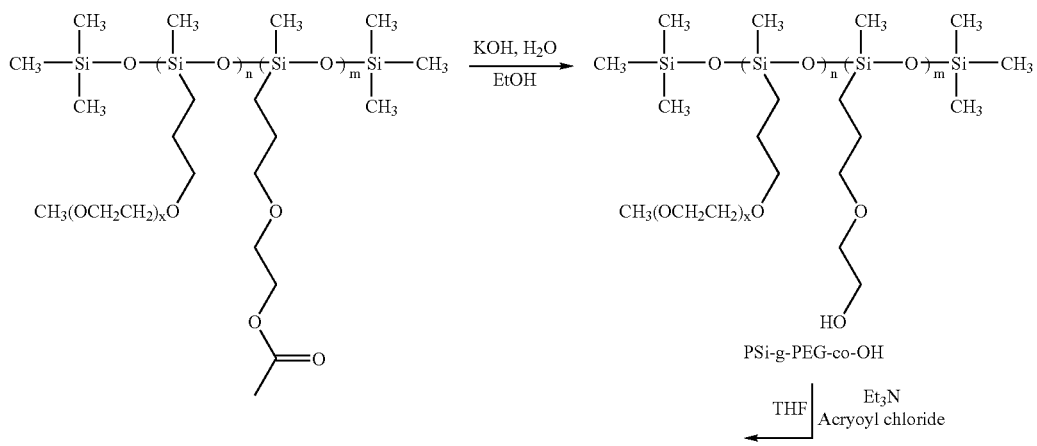

-continued

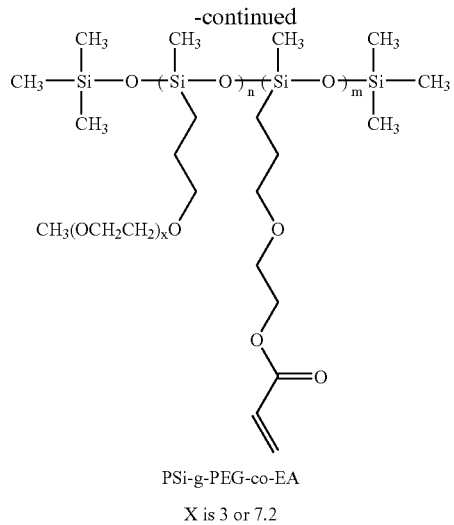

PSi-g-PEG-co-EA

X is 3 or 7.2

In a three-necked flask, KOH (2 g, 0.036 mol) was dissolved in 10 mL of distilled water and 100 mL of ethanol, and then dropwisely added with PSi-g-PEG-co-EAc (x=3) (7.6 g, 0.00114 mol) prepared in the above Preparation Example 5. The mixture was refluxed at 90° C. for 12 hrs under nitrogen atmosphere and then cooled down to room temperature. After vacuum evaporation to remove ethanol, the mixture was dissolved in distilled water, neutralized with a small amount of HCl, and then extracted a few times with chloroform and water. The resulting chloroform layer was separated, dried with $MgSO_4$ and then evaporated under reduced pressure to obtain about 5 g of AOEA (Yield: 82%) obtain about 16.2 g of poly[methyl(polyalkyleneoxide-co-ethoxyethanol)siloxane] (PSi-g-PEG-co-OH) (x=3) (Yield: 70%). NMR analysis revealed that n+m=24 and n/m=3.5.

$^1$H-NMR(300 MHz, $CDCl_3$): ppm 0.00-0.04(m, 3H), 0.40-0.45(s, 1.5H), 1.51-1.54(s, 1.5H), 2.9(s, 1H), 3.31-3.60 (m, 10H)

In the same way as above, 0.2 g of KOH and 5 g of PSi-g-PEG-co-EAc (x=7.2) were reacted and about 3.25 g of poly[methyl(polyalkyleneoxide-co-ethoxyethanol)siloxane] (Psi-g-PEG-co-OH) (x=7.2) was obtained (Yield: 65%). NMR analysis revealed that n+m=24 and n/m=3.5.

$^1$H-NMR(300 MHz, $CDCl_3$): ppm 0.00-0.04(m, 3H), 0.40-0.45(s, 1.5H), 1.51-1.54(s, 1.5H), 2.9(s, 1H), 3.31-3.60 (m, 18H)

In a three-necked flask, the above PSi-g-PEG-co-OH (x=3) (8 g, 0.00123 mol) and triethylamine (2 g, 0.02 mol) were dissolved in 100 mL of THF and then dropwisely added with acryloyl chloride (1.8 g, 0.02 mol), dissolved in 50 mL of THF, at 0° C. while stirring. After 12 hrs of reaction, the resulting precipitate was removed and evaporated under reduced pressure. The resulting yellow viscous liquid product was dissolved in chloroform and then extracted a few times with water. The resulting chloroform layer was separated, dried with $MgSO_4$ and then evaporated under reduced pressure to obtain about 5.6 g of PSi-g-PEG-co-EA (Yield: 70%). NMR analysis revealed that n+m=24 and n/m=3.5.

$^1$H-NMR(300 MHz, $CDCl_3$): ppm 0.00-0.04(m, 22H), 0.40-0.45(m, 10H), 1.51-1.54(m, 10H), 3.31-3.60(m, 80H), 4.05(t, 2H), 5.77(d, 1H), 6.08(q, 1H), 6.38(d, 1H)

In the same way as above, 5 g of PSi-g-PEG-co-OH (x=7.2) and 3.5 g of triethylamine and 0.4 g of acryloyl chloride were reacted and about 3.2 g of PSi-g-PEG-co-EA (x=7.2) was obtained (Yield: 64%). NMR analysis revealed that n+m=24 and n/m=3.7.

$^1$H-NMR(300 MHz, $CDCl_3$): ppm 0.00-0.04(m, 22H), 0.40-0.45(m, 10H), 1.51-1.54(m, 10H), 3.31-3.60(m, 123H), 4.05(t, 2H), 5.77(d, 1H), 6.08(q, 1H), 6.38(d, 1H)

The molecular weights of the polysiloxane-based compounds (structure 1) synthesized in the above Examples 1-4 were confirmed by NMR and GPC.

EXPERIMENTAL EXAMPLE 1

Ionic Conductivity Measurement

1. Measurement of Ionic Conductivity with Various Concentration of Lithium Salt

The ionic conductivity of electrolytes was measured by changing polymer electrolyte compositions at various concentration of lithium salt(lithium trifluoromethanesulfonate, $LiCF_3SO_3$). PSi-g-PEG-co-EA was used as a cross-linker while poly(ethyleneglycol) dimethylether(PEGDMe 250, Mw=250) was used as a plasticizer and benzoyl peroxide (BPO) as an initiator for thermal curing.

The above compositions were injected into a band-type conductive glass plate or a lithium-copper foil, polymerized by thermal curing, sufficiently cured and then the AC Impedance between the band-type or sandwich-type electrodes under argon atmosphere were measured by using a frequency response analyzer and the Complex Impedance spectra were analyzed. The band-type electrodes were attached to the center of the conducting glass plate (ITO) by means of a masking tape with a width of 1 mm at length of about 2 cm and then etched by dipping into an etching solution, washed and then dried. Ionic conductivity was measured for the electrolytes obtained by varying the concentration of lithium salts and the results are shown in the following table 1.

TABLE 1

| Cross-linker(g) PSi-g-PEG-co-EA(x = 3) | Plasticizer (g) PEGDMe250 | Lithium salt (g) $LiCF_3SO_3$ | Thermal Initiator (g) BPO | Ionic conductivity (S/cm) $\sigma \times 10^{-4}$ |
|---|---|---|---|---|
| 0.3 | 0.3 | 0.0465 | 0.009 | 2.00 |
| 0.3 | 0.3 | 0.0570 | 0.009 | 2.37 |
| 0.3 | 0.3 | 0.0710 | 0.009 | 4.00 |
| 0.3 | 0.3 | 0.0948 | 0.009 | 3.35 |
| 0.3 | 0.3 | 0.1420 | 0.009 | 3.00 |
| 0.3 | 0.3 | 0.2840 | 0.009 | 1.34 |

2. Measurement of Ionic Conductivity According to Various Kinds of Plasticizers

Ionic conductivity was measured at room temperature (30° C.) for the electrolyte thin films manufactured by using a plasticizer selected from the group consisting of PEGDMe 250, PSi-g-PEG (x=3), PSi-g-PEG (x=7.2) or a mixed solution wherein ethylene carbonate(EC) and propylene carbonate(PC) is mixed in 1:1 ratio, while using the cross-linker, the lithium salt and the thermal initiator of PSi-g-PEG-co-EA (x=3), LiCF$_3$SO$_3$ and BPO, respectively, same as in the above 1, and their results are shown in the following tables 2 and 3.

TABLE 2

| Cross-linker(g) PSi-g-PEG-co-EA(x = 3) | Plasticizer(g) | Lithium salt(g) LiCF$_3$SO$_3$ | Thermal initiator BPO (g) | Ionic conductivity (S/cm) σ × 10$^{-4}$ |
|---|---|---|---|---|
| 1.00 | PEGDMe 250 | 0.10 | 0.093 | 0.030 | 0.05 |
| 0.70 |  | 0.30 | 0.108 | 0.021 | 0.25 |
| 0.50 |  | 0.50 | 0.118 | 0.015 | 4.00 |
| 0.30 |  | 0.70 | 0.128 | 0.009 | 7.13 |
| 0.35 | PSi-g-PEG | 0.15 | 0.080 | 0.010 | 0.28 |
| 0.30 | (x = 3) | 0.30 | 0.100 | 0.010 | 0.36 |
| 0.30 |  | 0.70 | 0.178 | 0.010 | 0.62 |
| 0.35 | PSi-g-PEG | 0.15 | 0.088 | 0.010 | 0.33 |
| 0.30 | (x = 7.2) | 0.30 | 0.118 | 0.010 | 0.42 |
| 0.30 |  | 0.70 | 0.216 | 0.010 | 0.71 |

TABLE 3

| Cross-linker(g) PSi-g-PEG-co-EA(x = 3) | Plasticizer(g) | Lithium salt (g) LiPF$_6$ | Thermal initiator BPO (g) | Ionic conductivity (S/cm) σ × 10$^{-4}$ |
|---|---|---|---|---|
| 0.70 | EC/ | 0.30 | 0.045 | 0.021 | 3.00 |
| 0.50 | PC = 1:1 | 0.50 | 0.076 | 0.015 | 7.30 |
| 0.30 |  | 0.70 | 0.106 | 0.009 | 23.5 |

3. Measurement of Ionic Conductivity According to Various Kinds of Cross-Linkers Ionic conductivity was measured at room temperature for the electrolyte by using the cross-linker, the plasticizer, the lithium salt and the thermal initiator of PSi-g-PEG-co-EA (x=7.2), LiCF$_3$SO$_3$ and BPO, respectively, same as in the above 1, and the results are shown in the following table 4.

Figure 1:
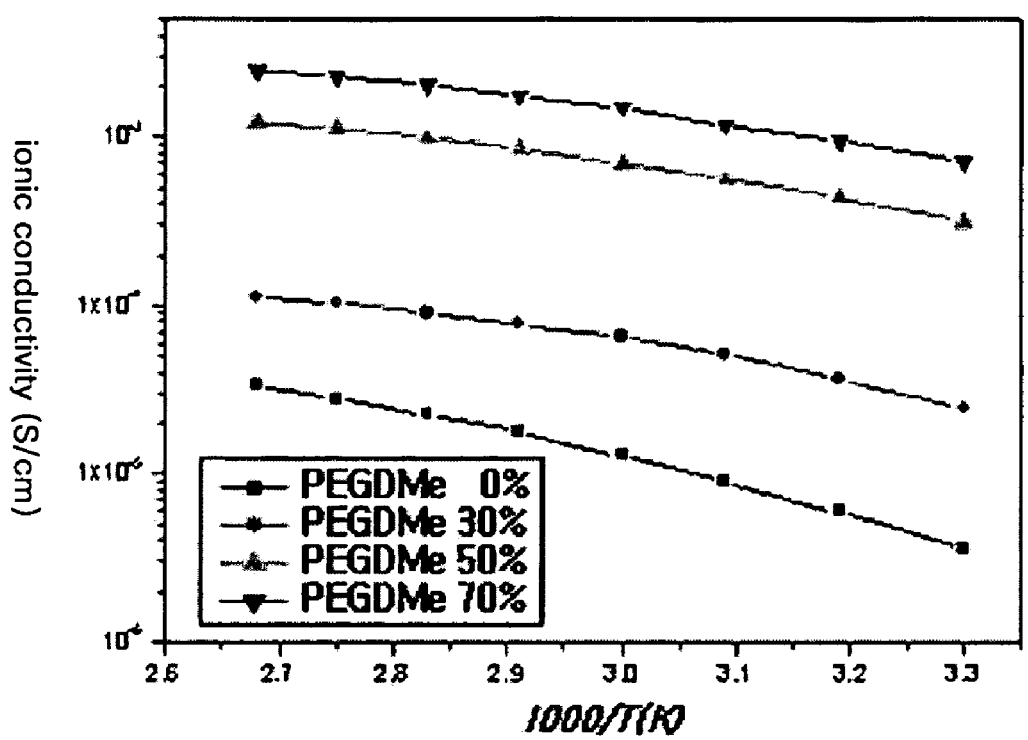
FIG. 1 shows the temperature dependence of ionic conductivity of a solid polymer electrolyte, wherein PSi-g-PEG-co-EA (x=3) is used as a cross-linker and PEGDMe is used as a plasticizer.

Further, the ionic conductivity measured by replacing only the cross-linker with PSi-g-PEG-co-EA (x=3) while using the other agents same as in the above 1 is shown in the FIG. 1.

In addition, the ionic conductivity measured by replacing only the plasticizer from PEGDMe 250 to PSi-PEG PSi-g-PEG-co-EA (x=3) while using the other agents same as in the above 1 is shown in the FIG. 2.

TABLE 4

| Cross-linker(g) PSi-g-PEG-co-EA(x = 7.2) | Plasticizer(g) PEGDMe 250 | Lithium salt(g) LiCF$_3$SO$_3$ | thermal initiator BPO (g) | Ionic conductivity (S/cm) σ × 10$^{-4}$ |
|---|---|---|---|---|
| 1 g | 0.000 g | 0.123 | 0.03 g | 0.07 |
| 1 g | 0.429 g | 0.184 | 0.03 g | 0.31 |
| 1 g | 1.000 g | 0.266 | 0.03 g | 4.35 |
| 1 g | 2.330 g | 0.457 | 0.03 g | 7.63 |

4. Comparison of Ionic Conductivity with Conventional Cross-linkers

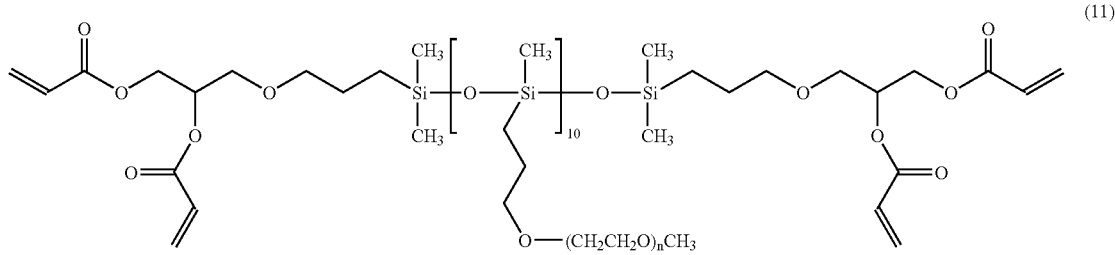

(11)

TA-10

Solid polymer electrolyte thin films were manufactured by using TA-10, a known cross-linker wherein a crosslinkable acrylate is substituted at a terminal end of a siloxane-based polymer, wherein polyalkyleneoxide is substituted as a side chain, and PSi-g-PEG-co-EA (x=3), a cross-linker manufactured in the present invention, were used as cross-linkers, respectively, and by using PEGDMe 250 or PC/EC (1:1) with varied amounts.

The ionic conductivity of electrolytes increases as the plasticizer content in the electrolytes increases, and thus it is preferable to manufacture electrolyte thin films with a relatively high content of the plasticizer. When the known cross-linker (TA-10) was used, electrolyte thin films were able to be manufactured only when the plasticizer was used up to 70 wt. %. On the contrary, in the present invention where PSi-g-PEG-co-EA (x=3) was used as a cross-linker, electrolyte thin films were able to be manufactured even when the plasticizer was used more than 80 wt. %.

The ionic conductivity of the electrolytes, wherein PSi-g-PEG-co-EA (x=3) was used as a cross-linker and PEGDMe250 or PC/EC(1:1) was used as a plasticizer about 80 wt. %, was $8.2 \times 10^{-4}$ S/cm and $6.5 \times 10^{-3}$ S/cm, respectively, which is higher than that obtained by using the known cross-linker (TA-10) while still capable of manufacturing thin film-type electrolytes. That is, when the cross-linker of the present invention was used it could lead to the increase in the plasticizer content thereby capable of manufacturing electrolytes with improved mechanical properties as well as increased ionic conductivity.

EXPERIMENTAL EXAMPLE 2

Electrochemical Stability

Solid polymer electrolyte thin films were manufactured by using the PSi-g-PEG-co-EA (x=3) as a cross-linker and PEGDMe as a plasticizer in the amount of 50 wt. % on the nickel electrodes with 1 cm×1 cm in size. Thus prepared thin films were placed between lithium metals and then sealed under vacuum to manufacture polymer cells for measuring electrochemical stability. The electrochemical stability was measured from about −0.3 to about 5.5 V at the scan rate of 5 mV/sec by using linear sweep voltammetry and the results are shown in FIG. 3.

As a result, a reversible plating/stripping of lithium was observed in the range of about −0.5 to about 0.2 V, and oxidative degradation current of polymer electrolytes was not found up to 4.6 V. That shows that the polymer electrolytes of the present invention were electrochemically stable up to 4.6 V versus lithium reference electrode, and were thus confirmed that they have sufficient electrochemical stability as polymer electrolytes for lithium polymer batteries.

INDUSTRIAL APPLICABILITY

Polysiloxane-based compound wherein a polyalkyleneoxide group and an acryl group are introduced as side chains to the backbone of methylsiloxane polymer can be used in various fields to improve mechanical properties such as the hardness of polymers such as rubber and plastic materials, elasticity, etc., as well as chemical or electrochemical stabilities.

The polysiloxane-based compounds are advantageous in that the methylsiloxane polymer in its backbone has a flexibility thus imparting improved mechanical properties such as elongation and bending of electrolytes while the polyalkyleneoxide group introduced at a side chain has improved compatibility with a plasticizer, which is used for the purpose of ionic conductivity of electrolytes.

In addition, the polysiloxane-based compound is further introduced with an acryl group which allows the polymer electrolyte to form a three-dimensional network structure and is also manufacture electrolytes that can control mechanical properties of electrolytes by means of controlling the concentration of an acryl group.

The solid polymer electrolyte of the present invention has excellent film forming property such that they can be applied to electrolyte thin films. Further, they have a wide scope of applications including small-sized lithium-polymer secondary batteries for devices such as portable information terminals in mobile phones, notebook computers and camcorders as well as large capacity lithium-polymer secondary batteries applicable to power storage devices for load leveling in peak power consumption and electrical vehicles.

While the foregoing description represent various embodiments of the present invention, it will be appreciated that the foregoing description should not be deemed limiting since additions, variations, modifications and substitutions may be made without departing from the spirit and scope of the present invention. It will be clear to one of skill in the art that the present invention may be embodied in other forms, structures, arrangements, and proportions and may use other elements, materials and components. The present disclosed embodiments are, therefore, to be considered in all respects as illustrative and not restrictive, the scope of the invention being indicated by the appended claims and not limited to the foregoing description.

The invention claimed is:

1. A polysiloxane-based compound having the following structure 1 wherein a polyalkyleneoxide group and an acryl group are introduced as side chains to the backbone of methylsiloxane polymer,

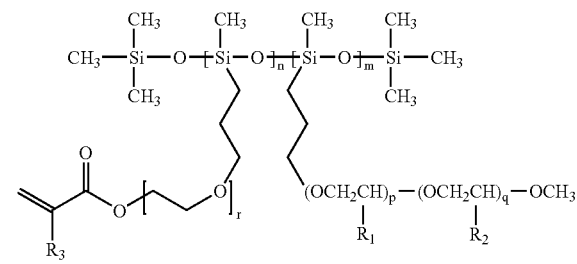

(1)

wherein $R_1$, $R_2$ and $R_3$ are independently a hydrogen atom or a methyl group; n and m are independently an integer of from 1 to 1,000; p and q are independently an integer of from 0 to 20 with the proviso that p and q are not 0 simultaneously; and r is an integer of from 1 to 20.

2. A polysiloxane-based cross-linker for solid polymer electrolyte having the following structure 1 wherein a polyalkyleneoxide group and an acryl group are introduced as side chains to the backbone of methylsiloxane polymer,

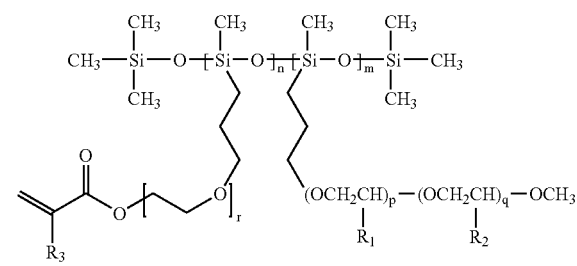

(1)

wherein $R_1$, $R_2$ and $R_3$ are independently a hydrogen atom or a methyl group; n and m are independently an integer of from 1 to 1,000; p and q are independently an integer of from 0 to 20 with the proviso that p and q are not 0 simultaneously; and r is an integer of from 1 to 20.

3. A solid polymer electrolyte composition comprising:
(a) about 0.1 to 95 wt. % of a cross-linker having the following structure 1,
(b) about 0.1 to 95 wt. % of at least one thermoplastic agent selected from the group consisting of polyalkyleneglycol dialkyl ether having the following structure 2, polymethyl(polyalkyleneoxide)siloxane having the following structure 3, and a non-aqueous polar solvent;
(c) about 3 to 40 wt. % of a lithium salt; and
(d) about 0.1 to 5 wt. % of a curable initiator,

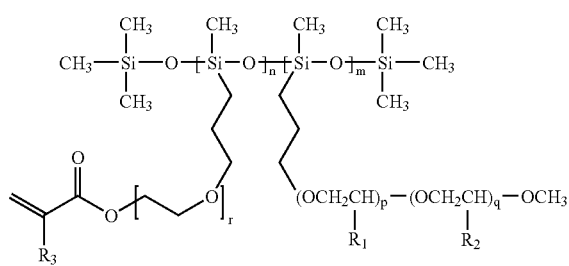

(1)

wherein $R_1$, $R_2$ and $R_3$ are independently a hydrogen atom or a methyl group; n and m are independently an integer of from 1 to 1,000; p and q are independently an integer of from 0 to 20 with the proviso that p and q are not 0 simultaneously; and r is an integer of from 1 to 20; and (2)

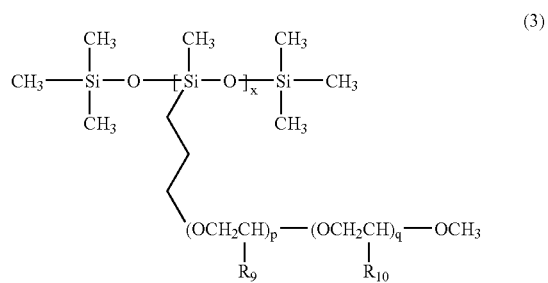

wherein $R_4$ and $R_5$ are independently a $C_1$-$C_{10}$ linear or branched alkyl group; $R_6$, $R_7$ and $R_8$ are independently a hydrogen atom or a methyl group; o, p and q are independently an integer of from 0 to 20 with the proviso that o, p and q are not 0 simultaneously;

(3)

wherein $R_9$ and $R_{10}$ are independently a hydrogen atom or a methyl group; x is an integer of from 1 to 1,000; p and q are independently an integer of from 0 to 20 with the proviso that p and q are not 0 simultaneously.

4. A solid polymer electrolyte thin film manufactured by coating the solid polymer electrolyte composition of claim 3.

5. A solid polymer electrolyte for small-sized lithium-polymer secondary batteries manufactured so that it comprises the solid polymer electrolyte composition of claim 3.

6. A solid polymer electrolyte for large capacity lithium-polymer secondary batteries manufactured so that it comprises the solid polymer electrolyte composition of claim 3.

* * * * *